United States Patent
Ito (10) Patent No.: US 9,542,857 B2
(45) Date of Patent: Jan. 10, 2017

(54) MATH TEACHING TOOL

(75) Inventor: Kyo Ito, Hyogo (JP)

(73) Assignee: PYGMALION KABUSHIKI KAISHA, Osaka (JP)

( * ) Notice: Subject to any disclaimer, the term of this patent is extended or adjusted under 35 U.S.C. 154(b) by 216 days.

(21) Appl. No.: 14/370,860

(22) PCT Filed: Jan. 11, 2012

(86) PCT No.: PCT/JP2012/050397
§ 371 (c)(1),
(2), (4) Date: Jul. 7, 2014

(87) PCT Pub. No.: WO2013/105234
PCT Pub. Date: Jul. 18, 2013

(65) Prior Publication Data
US 2015/0294596 A1    Oct. 15, 2015

(51) Int. Cl.
*G09B 19/02*    (2006.01)

(52) U.S. Cl.
CPC ..................... *G09B 19/02* (2013.01)

(58) Field of Classification Search
USPC .............. 434/188, 191, 194, 203, 204, 205, 208, 434/211, 195
See application file for complete search history.

(56) References Cited

U.S. PATENT DOCUMENTS

| 1,244,000 | A | * | 10/1917 | Soltoft | G09B 19/02 434/205 |
| 3,534,964 | A | * | 10/1970 | Guill | A63F 7/048 273/144 A |
| 3,811,205 | A | * | 5/1974 | Pitzler | G09B 19/02 434/203 |
| 3,864,850 | A | * | 2/1975 | Helmecke | G09B 19/02 434/207 |
| 4,210,093 | A | * | 7/1980 | Baker | G06C 1/00 116/222 |
| 4,553,944 | A | * | 11/1985 | Flanagan | G09B 19/02 434/191 |

(Continued)

FOREIGN PATENT DOCUMENTS

| JP | S57-14166 U | 1/1982 |
| JP | S59-21410 Y2 | 6/1984 |

(Continued)

OTHER PUBLICATIONS

International Search Report; PCT/JP2012/050397; Apr. 10, 2012.

(Continued)

*Primary Examiner* — Kurt Fernstrom
(74) *Attorney, Agent, or Firm* — Studebaker & Brackett PC (57) ABSTRACT

A math teaching tool is provided which can perform teaching more efficiently. The math teaching tool is characterized in the followings. It includes a vessel and a plurality of marbles disposed inside the vessel; the vessel includes a partition defining a boundary of a plurality of regions and a communication part allowing the plurality of regions defined by the partition to communicate with each other; at least one region of the plurality of regions of the vessel is configured so that the plurality of marbles are arrayed into a plurality of lines per unit of five marbles along a first direction of the vessel; and the plurality of marbles include five marbles connected together.

7 Claims, 6 Drawing Sheets

A (56) References Cited

U.S. PATENT DOCUMENTS

| | | | | |
|---|---|---|---|---|
| 5,395,245 A | * | 3/1995 | Heinz | G06C 1/00 |
| | | | | 223/48 |
| 5,971,269 A | * | 10/1999 | Baguley | G09B 23/02 |
| | | | | 235/136 |
| 6,241,572 B1 | * | 6/2001 | Braginsky | A63F 9/088 |
| | | | | 434/211 |
| 8,021,159 B1 | * | 9/2011 | Siegel | G09B 19/02 |
| | | | | 434/203 |

FOREIGN PATENT DOCUMENTS

| | | | | |
|---|---|---|---|---|
| JP | S63-162371 U | 10/1988 | | |
| JP | 2006-029937 A | 2/2006 | | |
| JP | 2007-212552 A | 8/2007 | | |
| JP | 2007212552 A | * | 8/2007 | G09B 19/02 |

OTHER PUBLICATIONS

An Office Action issued by the Korean Intellectual Property Office on Dec. 26, 2013, which corresponds to Korean Patent Application No. 1020137000402.

An Office Action issued by the Korean Intellectual Property Office on May 20, 2014, which corresponds to Korean Patent Application No. 1020137000402.

An Office Action; "Notification of Reasons for Refusal," issued by the Korean Patent Office on Dec. 26, 2013, which corresponds to Korean Patent Application No. 10-2013-7000402 and is related to U.S. Appl. No. 14/370,860; with English language translation.

An Office Action; "Decision of Refusal," issued by the Korean Patent Office on May 20, 2014, which corresponds to Korean Patent Application No. 10-2013-7000402 and is related to U.S. Appl. No. 14/370,860; with English language translation.

\* cited by examiner

MATH TEACHING TOOL

TECHNICAL FILED

The present invention relates to math teaching tools.

BACKGROUND ART

As one example of teaching tools used for teaching numerical cognition, addition and subtraction, etc. to infants and children in the lower grades of elementary school, a math teaching tool disclosed in Patent Document 1 is known, for example. The math teaching tool includes a drawer member partitioned so as to form two regions communicating with each other and a plurality of marbles disposed inside the drawer member.

Referring to the math teaching tool, the marbles inside the drawer member are moved between the two regions and/or entered into or taken out from the regions to change the number and disposition of the marbles in the regions to contribute to infants' and children's numerical cognition and number calculation.

PRIOR ART DOCUMENT

Patent Document

Patent Document 1: Japanese Patent Application Laid-Open Publication No. 2006-29937

SUMMARY OF THE INVENTION

Problems that the Invention is to Solve

However, the marbles of the aforementioned math teaching tool are independent of one another, which necessitates individual movement thereof. This means inconvenient usage. For example, in order to reduce a given number of marbles from a region, the marbles must be moved individually one by one by hand, which takes time and labor, thereby leading to inefficient teaching. Even if the marbles are not moved and hidden by hand or another object, infants and children may think that the marbles do not actually disappear and are only hidden. Accordingly, effective numerical cognition and understanding may not be achieved. Basically, the marbles must be moved.

The present invention has been made in view of the foregoing problem and has its object of providing a math teaching tool that can achieve more efficient teaching.

Means for Solving the Problems

A math teaching tool according to the present invention includes a vessel; and a plurality of marbles disposed inside the vessel, wherein the vessel includes a partition defining a boundary of a plurality of regions and a communication part allowing the plurality of regions defined by the partition to communicate with each other, at least one region of the plurality of regions of the vessel is configured so that the plurality of marbles are arrayed into a plurality of lines per unit of five marbles along a first direction of the vessel, and the plurality of marbles include five marbles connected together.

In one embodiment, the five marbles are connected together with a string.

In one embodiment, a through hole is formed in each of the five marbles.

In one embodiment, the vessel has an open upper face, and the math teaching tool further comprising a lid attached to the vessel so as to be capable of opening and closing the upper face of the vessel.

In one embodiment, the lid includes a plurality of regions corresponding to the plurality of regions of the vessel, and the plurality of regions of the lid are openable and closable independently of each other.

Advantages of the Invention

The math teaching tool according to the present invention includes the five marbles connected to one another. This enables all-together movement of the five marbles, thereby saving time and labor for marble movement to achieve efficient teaching.

DESCRIPTION OF PREFERRED EMBODIMENTS

Embodiments of the present invention will be described below with reference to the accompanying drawings. It is appreciated that the embodiments of the present invention are not intended to be limited to the configuration described in the following specification and the drawings and encompass configurations equivalent to the configurations of the embodiments.

Embodiment 1

Figure 1:
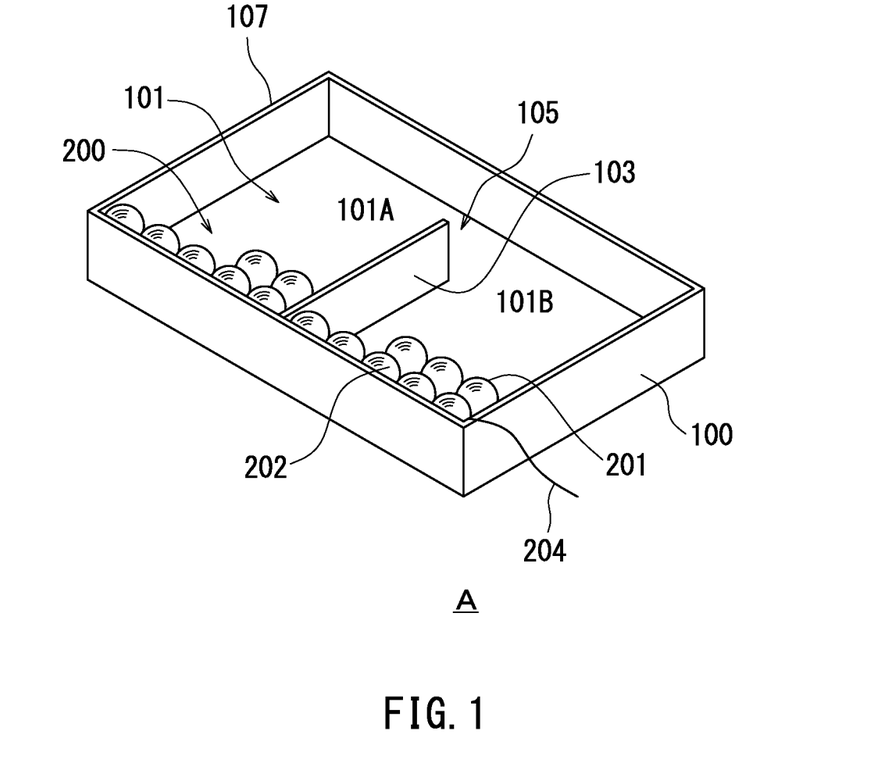
FIG. 1 is a schematic illustration showing a math teaching tool A according to Embodiment 1 of the present invention.

FIG. 1 is a schematic illustration showing a math teaching tool A according to Embodiment 1 of the present invention. The math teaching tool A includes a vessel 100 and a plurality of marbles 200. The vessel 100 is a rectangular hollow box. The plurality of marbles 200 are disposed inside the vessel 100.

The vessel 100 includes a partition 103 and a communication part 105. The partition 103 is provided inside the vessel 100 to serve as a boundary, thereby defining two regions 101 (101A, 101B) arranged side by side in a first direction (longitudinal direction of the vessel 100). Each region 101A, 101B is configured so that the plurality of marbles 200 are arrayed into four lines along the first direction and communicate with each other through the communication part 105 intervening between the regions 101. In Embodiment 1 of the present invention, five marbles of the plurality of marbles 200 are arrayed per one line along the first direction in the respective regions 101A, 101B.

Specifically, the partition 103 is provided orthogonally to the longitudinal direction of the vessel 100. One end of the partition 103 is connected to one inner wall of the vessel 100. The communication part 105 is space between the other end of the partition 103 and an inner wall opposite to the one inner wall of the vessel 100 and is formed so that only one marble of the plurality of marbles 200 can pass therethrough at one time.

It is noted that although the partition 103 defines two regions 101A, 101B arranged side by side in the longitudinal direction of the vessel 100 in Embodiment 1, the present invention is not limited thereto. The partition 103 may be provided along the longitudinal direction of the vessel 100 to define two regions arranged side by side in the direction orthogonal to the longitudinal direction of the vessel 100. In this case, the direction orthogonal to the longitudinal direction of the vessel 100 is the first direction, and the two regions of the vessel 100 are configured so that the plurality of marbles 200 are arrayed into four lines along the direction orthogonal to the longitudinal direction of the vessel 100.

The plurality of marbles 200 include two types of marbles 201 and marbles 202, which have the same size. The marbles 201 are independently moveable. The marbles 202 are connected in one line per unit of five and are movable in a group of unit of five. The plurality of marbles 200 are disposed in either one or both of the two regions 101A, 101B of the vessel 100 and are movable to the other region 101 via the communication part 105. Though not specifically limited, the marbles 201 and the marbles 202 of the plurality of marbles 200 may be made of plastic balls, glass balls, etc. for example. Further, the color of the marbles 201 and the marbles 202 may be lovely color, for example, white. If so, the marbles 200 can attract infants' and children's interest and therefore are preferable.

Figure 2:
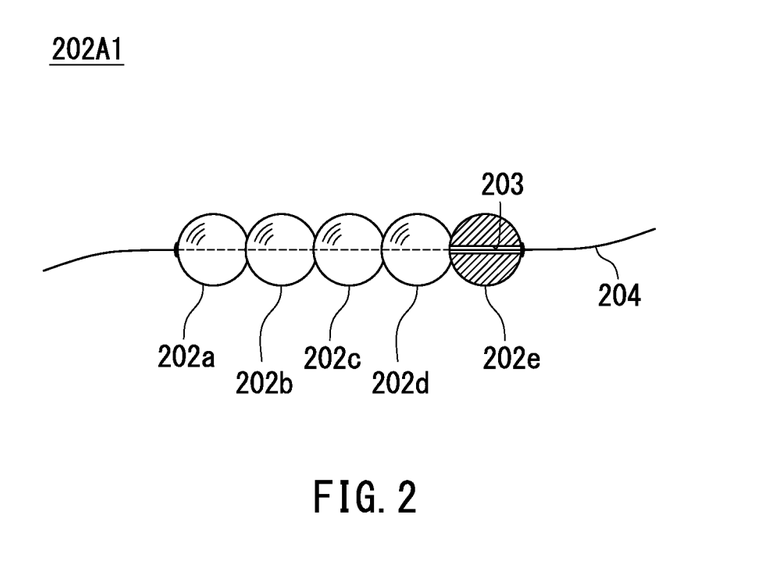
FIG. 2 is a schematic illustration showing a marble set of five marbles connected together in one line.
Figure 3:
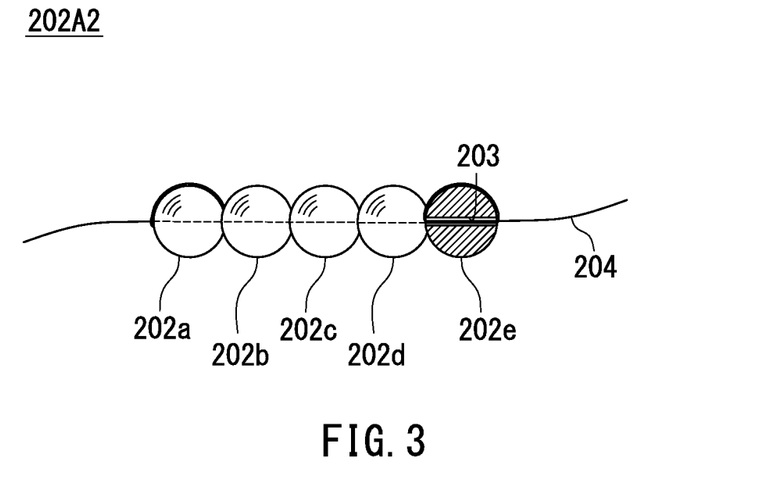
FIG. 3 is a schematic illustration showing a marble set of five marbles connected together in one line.
Figure 4:
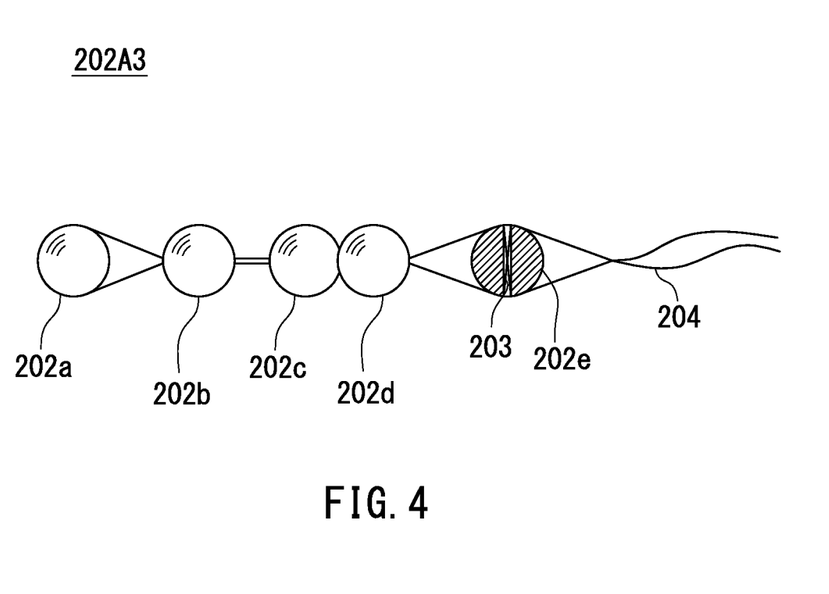
FIG. 4 is a schematic illustration showing a marble set of five marbles connected together in one line.

FIGS. 2-4 are schematic illustrations each showing a marble set 202A (202A1, 202A2, 202A3) obtained by connecting five marbles 202 (202a, 202b, 202c, 202d, 202e) in one line. The marbles 202 may be connected together with a string 204, for example. Specifically, through holes 203 are formed in the five marbles 202, and the string 204 is allowed to pass through the through holes 203. In this case, the method of knotting the string 204 is only required to connect the five marbles 202 and is not limited specifically, but the methods shown in FIGS. 2-4 are employable.

Referring to the marble set 202A1 shown in FIG. 2, the five marbles 202 are connected together in such a manner that one end of the string 204 is allowed to pass through the through hole 203 of each marble 202 in the order of the marbles 202a-202e, and then a knot of the string 204 is formed on each outside of the marble 202e and the marble 202e, which are located on the opposite sides of the line.

Referring to the marble set 202A2 shown in FIG. 3, the five marbles 202 are connected together in such a manner that after one end of the string 204 is allowed to pass through the through hole 203 of each marble 202 in the order of the marbles 202a-202e, the respective ends of the string 204 are wound around the outer surfaces of the marbles 202a and the marbles 202e and allowed to pass again through the through holes 203 of the marbles 202a, 202e, and then a knot of the string 204 is formed on each outside of the marble 202a and the marble 202e, which are located on the opposite sides of the line.

The marble set 202A3 shown in FIG. 4 will be described below. The five marbles 202 are connected together in the following manner. First, one end of the string 204 is allowed to pass through the through hole 203 of the marble 202a. Next, both the ends of the string 204 are allowed to pass through the through holes 203 of the marbles 202b, 202c, 202d in the order of the marbles 202b, 202c, and 202d. Further, both the ends of the string 204 are allowed to pass through the through hole 203 of the marble 202e from its opposite sides and then are tied up to form a knot.

As described with reference to FIGS. 1-4, with the math teaching tool A according to Embodiment 1 of the present invention, showing the plurality of marbles 200 in the region 101A and the region 101B to infants and children can lead to teaching on numbers and calculation. For example, teaching can be developed by gradually increasing the total number of the marbles 201 and the marbles 202 put in the respective regions 10A, 101B of the vessel 100 from the first step (one to three) to the second step (one to five), to the third step (one to ten), and then to the fourth step (one to twenty). Specifically, in the respective steps, teaching is carried out by the following manners. That is, in each step, a learner is made to count the numbers of the marbles 201 and the marbles 202 in the respective regions 101A, 101B, to answer as to which number is larger or smaller or whether the numbers are the same or not, to answer the number when the marbles 201 are added to the marbles 202 in the regions 101A and 101B, to answer the number when a given number is subtracted from the marbles in one of the regions 101, and the like. It is noted that the total number of the marbles 201 and the marbles 202 put in the regions 101A, 101B are set to up to twenty because it is said that around 90% of the learning ability about the number and calculation is developed through learning calculation based on the numbers of one to twenty.

The regions 101A, 101B of the vessel 100 are configured so that five of the marbles 201 and the marbles 202 are arrayed per one line. In making a learner to cognize the numbers, the learner is made to understand the numbers of the marbles 201 and the marbles 202 with reference to the numbers five and ten. That is, five of the marbles 21 or the marbles 202 in the region 101A or 10B are disposed in one line to form a reference of five or ten, so that the learner can understand which is larger or smaller than the reference. For example, in order to teach the number eight, it is taught that eight is larger by three than five and smaller by two than ten. In order to teach the number nine, it is taught that nine is larger by four than five and smaller by one than ten. In order to teach the number ten, it is taught that ten is larger by five than five. In order to teach the number larger than ten, it is taught that it is larger by some than ten. In this way, infants and children can understand the numbers in view of 5+α, 10-α, 10+α, and so on. Thus, effective numerical cognition and understanding can be achieved. It is noted that five and ten are used as the references because instant grasping of six or larger numbers out of the numbers of one to ten is difficult.

Further, since the plurality of marbles 200 of the math teaching tool A includes the marble set 202A in which the five marbles 202 are connected together through the string 204, in order to change the respective numbers and arrangement of the plurality of marbles 200 in the regions 101, only moving the marble set 202A can lead to addition or subtraction of the five marbles 202 at one time, thereby saving time and labor for the movement. Accordingly, efficient teaching can be achieved. In addition, in order to teach the number equal to or larger than five, with the use of the marble set 202A, showing all-together movement of the five marbles 202 to infants and children can lead to enhancement of their images that the five marbles 202 are one group, thereby allowing them to easily cognize five as a reference.

Embodiment 2

Figure 5:
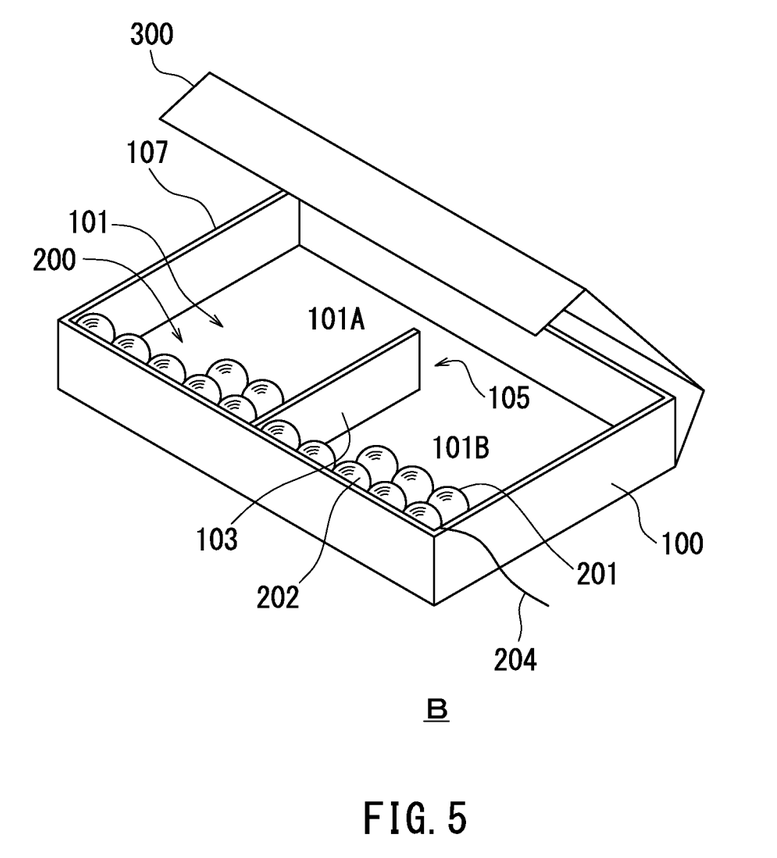
FIG. 5 is a schematic illustration showing a math teaching tool B according to Embodiment 2 of the present invention.

FIG. 5 is a schematic illustration showing a math teaching tool B according to Embodiment 2 of the present invention.

The math teaching tool B includes a vessel 100, a plurality of marbles 200, and a lid 300. The vessel 100 is a rectangular hollow box, of which upper face 107 is open. The plurality of marbles 200 are disposed inside the vessel 100. Since the vessel 100 and the plurality of marbles 200 have configurations similar to those in Embodiment 1 as described above, duplicate description will be omitted for avoiding redundancy.

The lid 300 is attached to the vessel 100 so as to open and close the upper face 107 of the vessel 100. Specifically, the lid 300 is formed in a sheet-like shape capable of covering the upper face 107 of the vessel 100 and is connected at one side end thereof to the rear side end of the vessel 100 so as to be capable of opening and closing the upper face 107 of the vessel 100. Lifting up the lid 300 configured as above from the upper face 107 can expose the regions 101 of the vessel 100. Closing the upper face 107 with the lid 300 can cover the regions 101 of the vessel 100. It is noted that the configurations of the lid 300 is exemplified as above, but the present invention is not limited thereto. As far as the regions 101 of the vessel 100 can be covered, any configuration may be employed. For example, the lid may be a hollow box-shaped cover of which opposite side faces are opened. In this case, when the vessel 100 is housed in the hollow box, the regions 101A, 101B are covered with the hollow box.

It is noted that when a magic tape (MAGICTAPE, registered trademark) is attached to each of the front side end of the vessel 100 and the free end of the lid 300, for example, the free end of the lid 300 can be fixed at the front side end of the vessel 100 by the adhesive force of the magic tape (MAGICTAPE, registered trademark). It is appreciated that the fixing means is required only to be capable of fixing the lid 300 to the vessel 100 in an openable and closable manner and is not limited to the magic tape (MAGICTAPE, registered trademark).

In the math teaching tool B according to Embodiment 2 of the present invention, the lid 300 is additionally provided to the vessel 100. When the lid 300 is closed, the marbles 201 and the marbles 202 can be confined in the two regions 101 of the vessel 100. Accordingly, in teaching using the math teaching tool B, the marbles 201 and the marbles 202 can be moved between the regions 101A and 101B through the communication part 105 by shaking the vessel 100 with the lid 300 closed. As a result, teaching variety increases. For example, after the marbles 201 and the marbles 202 respectively in the right and left regions 101A, 101B are gathered in one of the regions 101A, 101B, or the marbles 201 and the marbles 202 in one of the regions 101A, 101B are distributed to the right and left regions 101A, 101B, and the lid 300 is opened to show the inside of the vessel 100 to infants or children, they are allowed to guess the numbers of the marbles 21 and the marbles 202. Further, the movement of shaking the vessel 100 by hand and the sound caused by allowing the marbles 201 and the marbles 202 in the vessel 100 to hit the inner walls of the vessel 100 are effective in attracting infants' and children's interest, thereby amusing them while carrying out number and calculation teaching.

Embodiment 3

Figure 6:
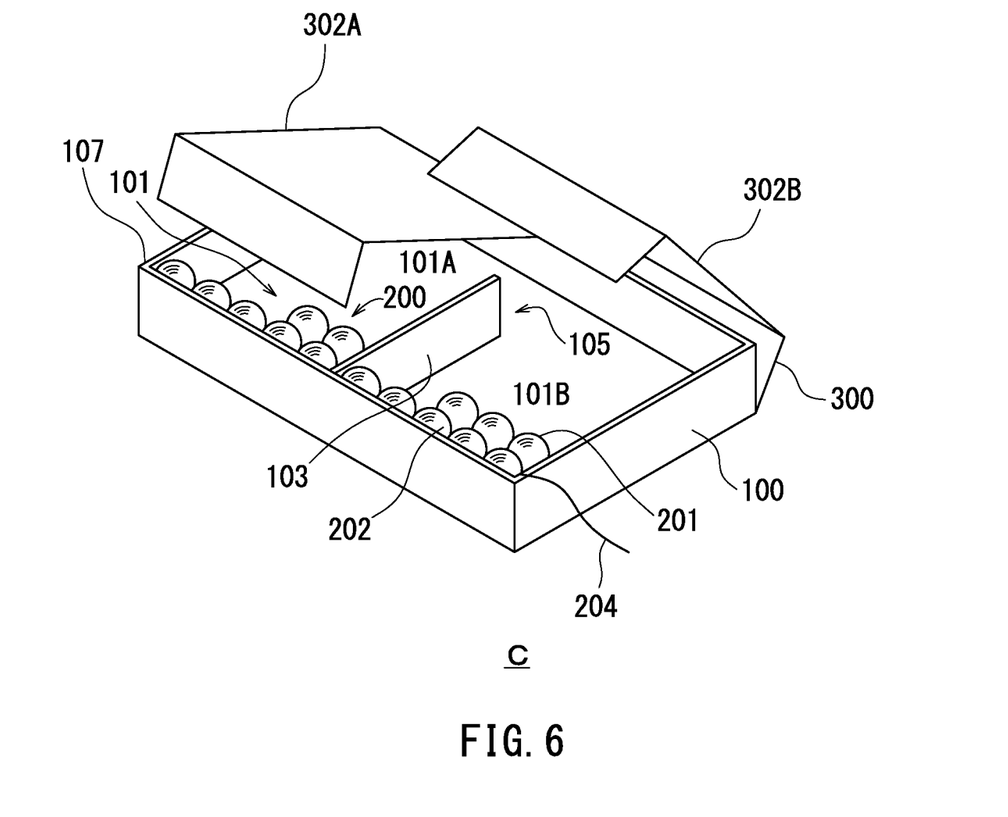
FIG. 6 is a schematic illustration showing a math teaching tool C according to Embodiment 3 of the present invention.

FIG. 6 is a schematic illustration showing a math teaching tool C according to Embodiment 3 of the present invention. The math teaching tool C includes a vessel 100, a plurality of marbles 200, and a lid 300. The vessel 100 is a rectangular hollow box, of which upper face 107 is open. The plurality of marbles 200 are disposed inside the vessel 100. Since the vessel 100 and the plurality of marbles 200 have configurations similar to those in Embodiment 1 as described above, duplicate description is omitted for avoiding redundancy.

The lid 300 is attached to the vessel 100 so as to open and close the upper face 107 of the vessel 100. The lid 300 includes two regions 302A, 302B respectively corresponding to the two regions 101A, 101B of the vessel 100. The two regions 302A, 302B of the lid 300 are independently openable and closable.

Specifically, the lid 300 is formed in a sheet-like shape capable of covering the upper face 107 of the vessel 100 and is connected at one side end thereof to the rear side end of the vessel 100 so as to be capable of opening and closing the upper face 107 of the vessel 100. The lid 300 includes the two regions 302A, 302B divided along the boundary of the two regions 101A, 101B of the vessel 100 and respectively corresponding to the two regions 101A, 101B of the vessel 100. The regions 302A, 302B are independent of each other and are configured to be capable of opening and closing the upper face 107 of the vessel 100. Lifting up the region 302A from the upper face 107 can expose the region 101A of the vessel 100. Closing the upper face 107 can cover the region 101A. Lifting up the region 302B from the upper face 107 can expose the region 101B of the vessel 100. Closing the upper face 107 can cover the region 101B. It is noted that the configuration of the lid 300 is exemplified as above, but the present invention is not limited thereto. As far as the lid 300 includes two regions corresponding to and independently openable and closable to the regions 101A and 101B of the vessel 100, any configurations may be employed.

Further, similar to Embodiment 2 as described above, in the present embodiment, when the magic tapes (MAGICTAPE, registered trademark) are provided at the front side end of the vessel 100 and the free ends of the regions 302A, 302B of the lid 300 in order not to unintentionally open the closed lid 300, the free ends of the regions 302A, 302B of the lid 300 can be fixed to the front side end of the vessel 100 by the adhesive force of the magic tapes (MAGICTAPE, registered trademark). It is also appreciated that the fixing means is required only to be capable of fixing the lid 300 to the vessel 100 in an openable and closable manner and is not limited to the magic tape (MAGICTAPE, registered trademark).

The lid 300, which includes the independently openable and closable regions 302A, 302B, is additionally provided to the vessel 100 in the math teaching tool C. Accordingly, when either one of the regions 302A, 302B is opened, and the marbles 201 and/or the marbles 202 in only the region of the vessel 100 corresponding to the opened region of the lid 300 are shown, teaching can be carried out. For example, after the marbles 201 and the marbles 202 are put into either one of the region 101A and the region 101B of the vessel 100, the vessel 100 is shaken to distribute the marbles 201 and the marbles 202 to the regions 101A and 101B. Thereafter, only the region 302A (or the region 302B) of the lid 300 is opened to show the marbles 201 and the marbles 202 in the region 101A (or the region 101B) of the vessel 100. Then, a learner is made to guess the total number of the marbles 201 and the marbles 202 in the region 101B (or the region 101A) of the vessel 100. That is, the learner is made to guess the number obtained by subtracting the total number of the marbles 201 and the marbles 202 remaining in the region 101A (or the region 101B) after distribution from the total number of the marbles 201 and the marbles 202 first put thereinto, thereby achieving subtraction teaching. Further, when both the regions 302A and 302B of the lid 300 are closed, the teaching described in Embodiment 2 can be carried out.

Referring to Embodiments 1-3 of the present invention as described above, the two regions are defined in the vessel, and the plurality of marbles disposed inside the regions include only one marble set, but the present invention is not limited thereto. According to necessity in teaching, two or more regions may be defined in the vessel, and/or one or more marble sets may be disposed inside the regions.

In addition, the vessel may be formed in a manner that the plurality of regions are colored differently. The regions in different colors facilitate region discrimination, thereby allowing instant recognition of a given region by infants and children in teaching.

INDUSTRIAL APPLICABILITY

The present invention is applicable to a math teaching tool used in teaching numerical cognition and addition and subtraction to infants and children in the lower grades of elementary school.

EXPLANATION OF REFERENCE CHARACTERS

A, B, C math teaching tool
100 vessel
101, 101A, 101B region
103 partition
105 communication part
107 upper face
200 a plurality of marbles
201 marble
202 marble
202A marble set
203 through hole
204 string
300 lid
302A, 302B region

The invention claimed is:

1. A math teaching tool comprising:
a vessel; and
a plurality of marbles disposed inside the vessel,
wherein the vessel includes a partition defining a boundary of a plurality of regions and a communication part allowing the plurality of regions defined by the partition to communicate with each other,
at least one region of the plurality of regions of the vessel is configured so that the plurality of marbles are arrayed into a plurality of lines per unit of five marbles along a first direction of the vessel, and
the plurality of marbles include a plurality of independently movable marbles and five marbles connected together.

2. The math teaching tool of claim 1, wherein
the five marbles are connected together with a string.

3. The math teaching tool of claim 1, wherein
a through hole is formed in each of the five marbles.

4. The math teaching tool of claim 1, wherein
the vessel has an open upper face, and
the math teaching tool further comprising a lid attached to the vessel so as to be capable of opening and closing the upper face of the vessel.

5. The math teaching tool of claim 4, wherein
the lid includes a plurality of regions corresponding to the plurality of regions of the vessel, and
the plurality of regions of the lid are openable and closable independently of each other.

6. The math teaching tool of claim 1, wherein
the plurality of independently movable marbles are the same in size as the five marbles connected together.

7. The math teaching tool of claim 1, wherein
the plurality of regions of the vessel are different in color from one another.

* * * * *